United States Patent
Moody, II et al.

(10) Patent No.: US 7,711,913 B1
(45) Date of Patent: May 4, 2010

(54) SYSTEM AND METHOD FOR BACKING UP EXTENDED COPY COMMANDS

(75) Inventors: William H. Moody, II, Austin, TX (US); Robert Sims, Round Rock, TX (US)

(73) Assignee: Crossroads Systems, Inc., Austin, TX (US)

( * ) Notice: Subject to any disclaimer, the term of this patent is extended or adjusted under 35 U.S.C. 154(b) by 355 days.

(21) Appl. No.: 11/788,650

(22) Filed: Apr. 20, 2007

Related U.S. Application Data

(60) Provisional application No. 60/793,345, filed on Apr. 20, 2006.

(51) Int. Cl.
  *G06F 12/00* (2006.01)
  *G06F 13/00* (2006.01)
(52) U.S. Cl. .................. 711/162; 711/161; 711/111; 711/4; 714/13
(58) Field of Classification Search .......... 711/162, 711/111, 4, 161; 714/16, 15, 13
See application file for complete search history.

(56) References Cited

U.S. PATENT DOCUMENTS

| | | | |
|---|---|---|---|
| 6,704,836 B1 * | 3/2004 | Griswold et al. | 711/113 |
| 7,032,131 B2 * | 4/2006 | Lubbers et al. | 714/16 |
| 7,409,587 B2 * | 8/2008 | Perry | 714/15 |
| 7,447,852 B1 * | 11/2008 | Justiss | 711/161 |
| 2002/0199073 A1 * | 12/2002 | Tamura et al. | 711/162 |
| 2003/0167312 A1 * | 9/2003 | Mori | 709/212 |
| 2004/0177098 A1 * | 9/2004 | Tamura et al. | 707/200 |
| 2006/0080507 A1 * | 4/2006 | Tyndall et al. | 711/132 |

* cited by examiner

*Primary Examiner*—Hong Kim
(74) *Attorney, Agent, or Firm*—Sprinkle IP Law Group

(57) ABSTRACT

Embodiments of the present invention provide systems and methods for backing up data through recordation and issuance of extended copy and media commands. One embodiment of the present invention can include a method for backing up data comprising, receiving one or more extended copy commands for a requested operation, receiving one or more media commands for the operation, recording the one or more media commands, recording the one or more extended copy commands and retrieving and issuing the recorded one or more extended copy commands and the recorded one or more media commands for the operation to perform the requested operation.

21 Claims, 4 Drawing Sheets

SYSTEM AND METHOD FOR BACKING UP EXTENDED COPY COMMANDS

RELATED APPLICATIONS

This application claims under 35 U.S.C. 119(e) the benefit of and priority to U.S. Provisional Application No. 60/793,345 entitled "System and Method for Performing Backup Using Extended Copy Functionality", by Moody et al., filed Apr. 20, 2006, which is hereby fully incorporated by reference herein.

TECHNICAL FIELD OF THE INVENTION

Embodiments of the invention relate generally to storage and retrieval of data and more particularly to systems and methods for performing backup of data using extended copy commands.

BACKGROUND

Businesses, governmental organizations and other entities are increasingly saving large volumes of data necessary for daily operations. In order to provide proper protection of data for business and legal purposes (e.g., to ensure quick recovery of data in the event of a disaster or to comply with document retention requirements), entities often back up data to a physical media, such as magnetic tapes, on a regular basis. Traditional backup systems placed an application server, backup server, source device, destination device and a local area network ("LAN") in the data path of backup operations. Under these systems, the LANs were becoming overburdened by the amount of data being copied. Often, the backup window (the period in which data unavailable for normal operations in order to permit backup) was too short to achieve a complete backup of data. Many entities have now implemented Storage Area Networks ("SAN") to relieve much of the burden of mass data storage and backup from the LAN, freeing the LAN for more immediate data storage and manipulation operations.

The T10/99-143r1, "Working Draft SCSI Extended Copy Command" (the "99-143r1 Draft") and NCITS T10 SPC-2 (SCSI Primary Commands-2) ("SPC-2") provide a mechanism for a computer backup application to delegate actual data movement to third party devices known as "copy manager devices" or "data mover devices". In addition to the extended copy commands, the backup application may issue media commands. For example, if either the source or destination of the extended copy command is a removable media device, then the backup application may first have to issue media commands to move the media to the proper position (e.g., to rewind the tape).

The copy manager devices move data from source devices to destination devices as designated by the backup application in "segment descriptors" which in part constitute the parameter list of an extended copy command. The copy manager devices translate the extended copy commands into a series of lower-level read/write commands and execute the lower-level commands. The extended copy command is often used to backup data from random access devices, such as hard drives, to sequential access devices, such as tape drives.

The execution of an extended copy command to backup data carried out over a SAN may fail because of problems with tapes, tape drives, tape libraries, and the transmission of data across the SAN. An attempt to recover from the failure may fail, because the data is no longer available. The data, for example, may have been modified before the recovery attempt, and no other copy of the data may be available. To recover from backup failures, some entities use disk to disk to tape backup mechanisms. Backup is first performed from primary disk storage to secondary disk storage and then from secondary disk storage to tape. The data in the secondary disk storage is preserved, at least until backup is successful. On the failure of an attempt to backup data from secondary disk storage to tape, the data is available unchanged for retrying the backup of the data. The use of disk to disk to tape backup mechanisms to provide guaranteed backup is relatively slow and inefficient in the use of space. The copying of data from primary disk storage to secondary disk storage adds considerably to the time required for backup. In addition, as successive backups are made, the copying of data from primary storage to secondary storage requires space for multiple copies of the data copied from primary disk storage. Further, restoration is a cumbersome process, requiring the copying of data from the tape to the secondary disk storage followed by the copying of the data from the secondary disk storage to the primary disk storage.

SUMMARY OF THE INVENTION

Embodiments of the present invention provide a system and method for backing up data that eliminates, or at least substantially reduces, the shortcomings of prior art systems and methods for backing up data.

One embodiment of the present invention can include a method for backing up data comprising, receiving one or more extended copy commands for a requested operation, receiving one or more media commands for the operation, recording the one or more media commands, recording the one or more extended copy commands and retrieving and issuing the recorded one or more extended copy commands and the recorded one or more media commands for the operation to perform the requested operation.

Another embodiment of the present invention can include a computer program product comprising a set of computer executable instructions stored on a computer readable medium. The set of computer instructions are executable by a processor to receive one or more extended copy commands for a requested operation, receive one or more media commands for the operation, record the one or more media commands, record the one or more extended copy commands and issue the recorded one or more extended copy commands and the recorded one or more media commands to perform the requested operation.

Yet another embodiment of the present invention can include a system comprising a host operable to issue one or more extended copy commands to copy data from a first storage device to a second storage device and issue one or more media commands to a media controller; a copy manager in communication with the host configured to execute the one or more extended copy commands; and a guaranteed backup controller in communication with the copy manager configured to record the one or more extended copy commands and the one or media commands in storage.

Embodiments of the present invention provide an advantage over prior art systems and methods of backing up data in a file system by reducing the duration of the backup window.

Embodiments of the present invention provide another advantage by reducing the storage space, the power consumption, and the cooling requirements needed for backup operations.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a system and method for backing up data. A guaranteed backup controller, according to one embodiment of the present invention, can record media commands and extended copy commands. The method can include executing the media commands and the extended copy commands. If execution is not successful, the method can further include retrieving the recorded commands for execution.

In one embodiment, the method can include taking a snapshot of data stored on one or more storage devices (i.e., a snapshot of the original data to be backed up). The method can further include issuing an extended copy command to backup a portion of the snapshot of the data. The method can further include executing the extended copy command, thereby backing up a portion of the data.

Figure 1:
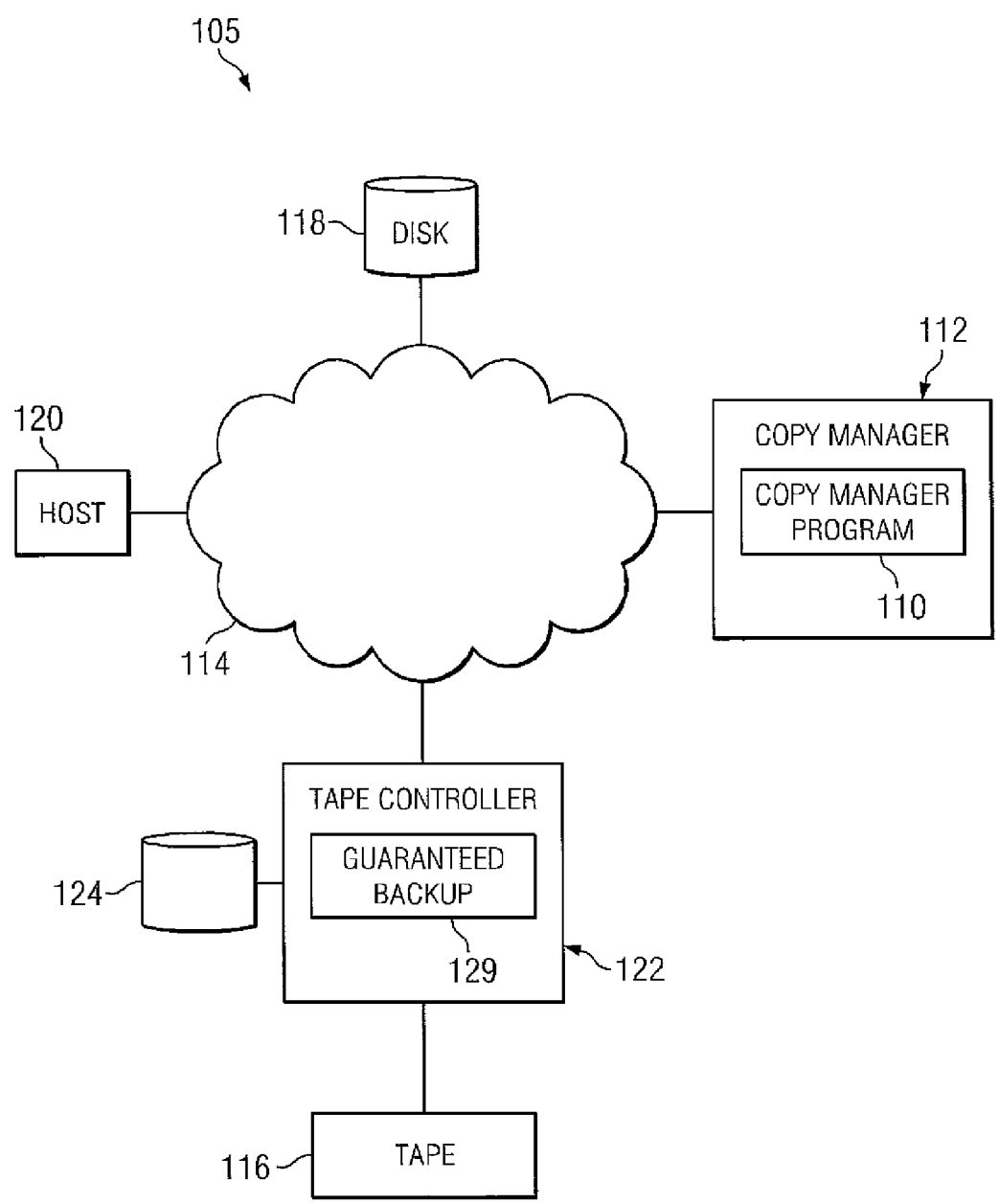
FIG. 1 is a diagrammatic representation of a system for performing backup of data according to one embodiment of the present invention.

FIG. 1 is a diagrammatic representation of a System 105 for performing backup of data according to one embodiment of the present invention. In this embodiment, a copy manager program 110 capable of processing an extended copy command can be located at a copy manager or data mover 112 (e.g., a third party copy device, a router, such as a storage router or other device). However, it should be noted that the copy manager program 110 can be located at any device (e.g., servers, third-party copy devices, media controllers or other device) in the command path capable of processing an extended copy command and recording it for later retrieval and is not limited to being implemented at routers.

For the sake of example, data mover 112 can be a device connected to a Fibre Channel or other transport medium or a device connected between transport media, such as a Fibre Channel-to-Fibre Channel router. Copy manager program 110 can be implemented in other devices including, but not limited to: Fibre Channel to SCSI routers; SCSI to SCSI routers; iSCSI to iSCSI routers; Fibre Channel to iSCSI routers; iSCSI to Fibre Channel routers; iSCSI to SCSI routers; SCSI to iSCSI routers; Fibre Channel to Infiniband routers; Infiniband to Fibre Channel routers; Fibre Channel to Serial Attached SCSI routers; Serial Attached SCSI to Fibre Channel routers; iSCSI to Serial Attached SCSI routers; Serial Attached SCSI to iSCSI routers; Fibre Channel to Serial SCSI Architecture routers; Serial Attached SCSI to Fibre Channel routers; Infiniband to Serial Attached SCSI routers; Serial Attached SCSI to Infiniband routers and other routers, bridges, hubs, switches or other devices supporting various protocols that use or can take advantage of the extended copy command.

In the embodiment of the data backup system of FIG. 1, data mover 112 is coupled to a storage device 118 (e.g., a hard disk drive), a host 120 and a media controller 122 (e.g., tape controller 122) by a first data transport medium 114 (e.g., a Fibre Channel SAN or other data transport medium). Tape controller 122 is connected to a first storage device 116 (e.g., a tape drive 116) and thus acts as a tape controller 122. While the example of tape controller 122 and tape drive 116 will be used for the sake of example, embodiments of the present invention can be implemented with other storage media and controllers (e.g., optical storage devices, hard disks or other storage device). Copy manager program 110 can transfer data between various storage devices including, but not limited to, optical drives, tape drives, hard drives, redundant arrays of independent disks ("RAID") devices and other devices known in the art. Further, the copy manager program 110 can be capable of both processing an extended copy command and recording and retrieving an extended copy command. Tape drive 116 may be a single tape drive or a component of a media library. One example of a media library commonly used in enterprise backup systems is a magnetic tape library. The tape controller or tape controllers and media library may provide error-reporting capabilities, such as notifying a program such as copy manager 110 of errors in a backup operation, such as a defective tape or no tape in place.

In an embodiment of the invention, the first storage device 116 may consist of dual ported fibre channel tape drives. The tape drives may be connected to the fibre channel data transport medium 114 by redundant tape controllers to provide continued operation should a drive link fail.

Tape controller 122 can include a guaranteed backup program 129 to provide for guaranteed backup of data, as discussed below. Thus, tape controller 122 can act as a guaranteed backup controller. A storage device 124 can be used by tape controller 122 to store commands for backup operations. Storage 124 can be secure storage such as a RAID array.

In the embodiment of FIG. 1, the system may be capable of taking snapshots of data, of freezing the snapshots of the data, and of performing other data storage functions. Snapshots provide a mechanism for making fast copies of data. A snapshot is a record of the state of a system at a point of time. One technique for taking snapshots utilizes "mirroring" wherein the data on a volume ("primary" volume) is automatically copied or mirrored on another volume ("secondary" volume) on the same disk or another disk. The mirror is initiated by copying the data on the primary volume to the secondary volume. Thereafter, data written to the primary volume is automatically written to secondary volume as well. To preserve a copy of the data on the primary volume at a particular time, the automatic writing of data to the secondary volume is halted ("the mirror is broken"). As a result, the secondary volume contains a copy of the data on the primary volume at the time the mirror was broken.

Another technique for taking snapshots of data utilizes a set of pointers to the data. With this technique, only the data changed since a previous snapshot is copied to the snapshot storage area to create a current snapshot of the data. The unchanged data has already been copied to the snapshot storage area during snapshots of older versions of the data. A set of pointers shows the location of the newly-copied data and the previously-copied data in the snapshot storage area.

System 105 may take snapshots through the use of mirrors, pointers, or other methods of taking snapshots. The capacity to take snapshots may reside in the host 120, in the data mover 112, or in a separate device not shown in FIG. 1. Snapshots may be taken of data stored in disk 118, and the snapshots stored on disk 118 or other storage device. System 105 may freeze a snapshot after taking the snapshot. System 105 may freeze the snapshot by halting the taking of additional snapshots of the data that produced the snapshot, by marking the snapshot as read-only memory, or by other means of freezing the snapshot of the data.

In operation, host 120 can issue an extended copy command to copy manager program 110 to delegate to it the management of copy tasks involving other network components, such as tape drive 116 and hard disk drive 118. Copy manager program 110 processes these extended copy commands to issue data movement commands (e.g., read and write commands), reading data from one of the network devices and writing (copying) the data to another one of the components.

The use of the extended copy command allows host 120 to use its own processing power on tasks other than the mere movement of data between network components. For example, it is possible for host 120 to back up hard disk drive 118 to tape drive 116 (a potentially lengthy process) by issuing one or more extended copy commands to copy manager program 110. Copy manager program 110 can then copy the data specified by the extended copy commands using the source and destination addresses specified without the intervention of host 120. The extended copy command may direct copy manager program 110 to copy the original data from hard disk drive 118. Alternatively, a snapshot may be taken of the data and stored on hard disk drive 118 or other data storage medium, and the extended copy command may direct copy manager program 110 to copy the data from the snapshot on hard disk drive 118 (or other storage device) to the tape drive 116.

Similarly, host 120 can issue one or more extended copy commands to data mover 112 to direct copy manager program 110 to restore data from the tape drive 116 to hard disk drive 118. The extended copy commands may specify that the data be copied directly from tape drive 116 to hard disk drive 118. The restoration process can similarly take place without the intervention of host 120. According to one embodiment of the present invention, host 120 can also issue media commands (e.g., non-Extended copy command commands issued to the tape controller 122 during the backup operation) to tape controller 122 related to copying data from disk drive 118 to tape drive 116.

According to one embodiment of the present invention, when copy manager program 110 receives an extended copy command, copy manager program 110 can forward the extended copy command to guaranteed backup program 129 on tape controller 122 (or other device acting as a guaranteed backup controller) for recordation. This can be done, for example, via an Ethernet connection or other connection. When guaranteed backup program 129 receives a media command or an extended copy command via transport medium 114 or other connection, guaranteed backup program 129 can store the command in storage 124. Consequently, the extended copy command and associated media commands (i.e., commands to the tape drive or other media drive) for a backup operation or other data movement operation can be recorded. According to one embodiment, these commands are recorded in the order that they are issued by host 120 so that they can reissued in the same order.

In some embodiments of the present invention, the original extended copy command and media commands issued by host 120 can be executed by copy manager program 110 and tape drive 116. Copy manager program 110 can execute the original extended copy command to issue data movement commands. Similarly, tape drive 116 can execute the media commands. Thus, the extended copy operation will be attempted, while a record of the extended copy and associated media commands is kept in case of failure of the initial operation.

In other embodiments, the backup process can be divided into a virtual and an actual phase. In the virtual phase, the copy manager program 110 can receive the extended copy command issued as part of the backup operation and can return good completion results. In addition, the extended copy commands can be recorded (e.g., in storage 124). Guaranteed backup program 129 can receive the media commands, return good completion results, and record the media commands. In the actual phase of backup, guaranteed backup program 129 can reissue the media commands and extended copy commands for an operation in the same order that they were initially issued by host 120. Copy manager program 110 can execute the extended copy commands to issue corresponding read/write commands.

In the above example, tape controller 122 acts as the guaranteed backup controller recording and reissuing the extended copy command and media commands for an operation. In other embodiments, the guaranteed backup controller can be located at data mover 112 (e.g., as part of the copy manager) or at a separate guaranteed backup device that receives and records the extended copy command and associated media commands (e.g., the guaranteed backup device can communicate the recorded extended copy command to the copy manager and recorded media commands to the tape (or other media) controller).

Figure 2:
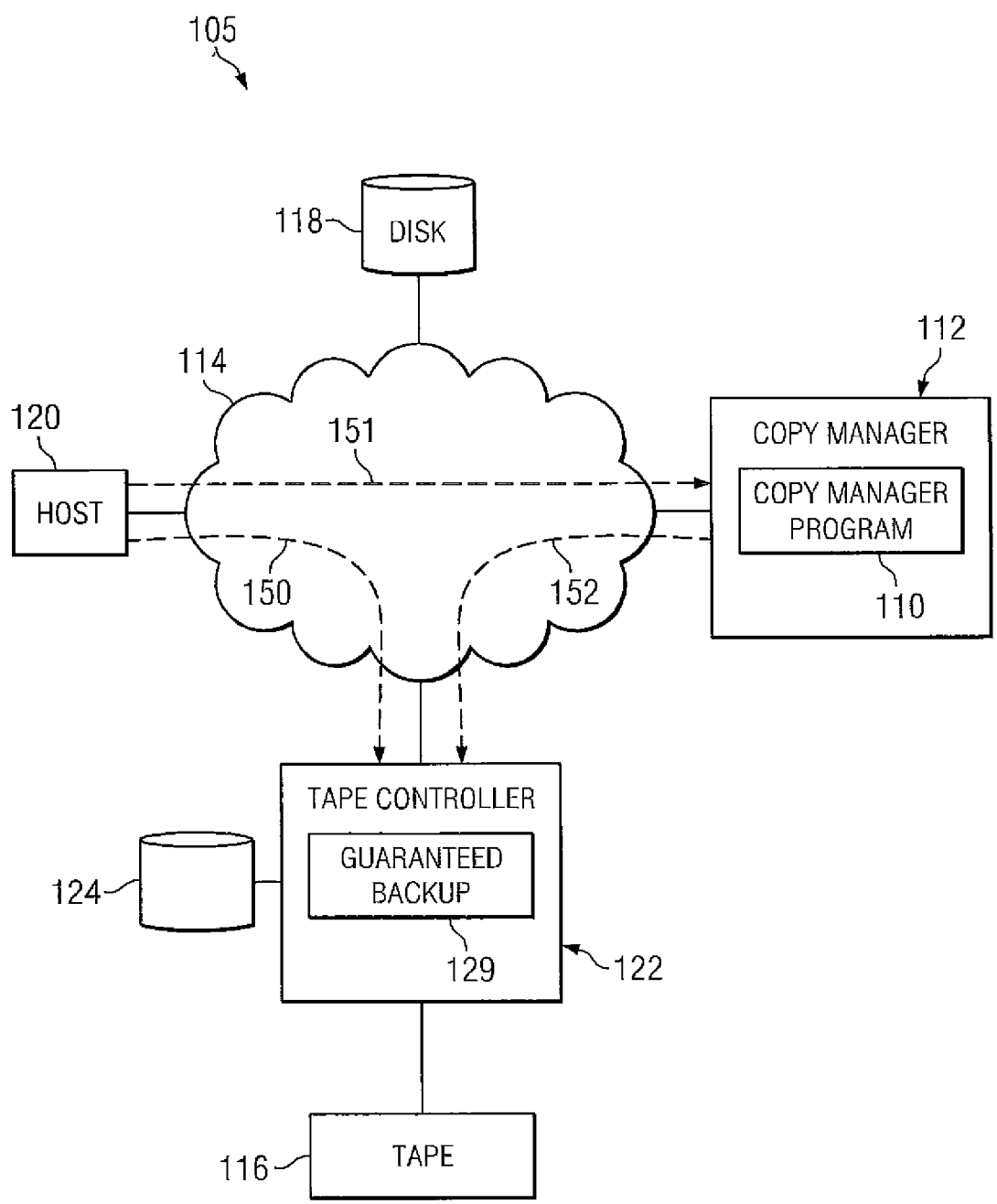
FIG. 2 is a diagrammatic representation of the flow of commands relating to a backup operation and corresponding data flows according to one embodiment of the present invention.

FIG. 2 is a diagrammatic representation of the flow of commands relating to a backup operation and the corresponding flow of data according to one embodiment of the data storage System 105 of the present invention. FIG. 2 includes the elements of the example network structure shown in FIG. 1. FIG. 2 includes dashed lines depicting the flow of commands and solid lines depicting the flow of data that occur through the system during a backup operation that is performed using snapshots and extended copy commands. Host 120 can issue a media command (e.g., a command that is intended for tape drive 116) to tape controller 122 (represented by flow 150) and an extended copy command to copy manager program 110 (represented by flow 151). Copy manager program 110, according to one embodiment of the present invention, can forward the extended copy command to guaranteed backup program 129 (represented by flow 152). Guaranteed backup program 129 can store the extended copy command and media commands in storage 124. In this embodiment in which guaranteed backup program 129 runs on tape controller 122, tape controller 122 acts as a guaranteed backup controller to record an extended copy command and associated media commands for a backup operation. The commands can be recorded in such manner that the commands can later be reissued in the correct order (e.g., using timestamps, flags, sequence numbering, metadata or other suitable mechanism).

In connection with the issuance of the extended copy command, system 105 may issue a command to take a snapshot of the data that is the subject of the extended copy command. The snapshot process can be initiated by host 120 or other device prior to issuance of the extended copy command and the snapshot can be taken using known or developed snapshot applications and techniques. In alternative embodiments, the snapshot command may be issued by another device not shown in FIG. 2. The target of the snapshot command may be a drive controller, server or other device not shown in FIG. 2. The snapshot may be stored in hard disk drive 118 or other disk drive. The data for the snapshot may consist of all of the data making up the snapshot or it may consist of data stored in hard disk 118 that is not already contained in a previous snapshot.

In one embodiment, the copy manager program 110 and tape controller 122 attempt to process the extended copy command and media commands when initially received, while also forwarding the commands to guaranteed backup program 129 for recording. In this embodiment, the guaranteed backup program 129 retrieves the recorded commands only when an attempted execution fails. In other embodiments, the commands are not executed when originally issued. Instead, the commands are recorded for later retrieval and execution. The commands may be retrieved from storage by guaranteed backup program 129 multiple times for execution if earlier attempts to execute fail.

It should be noted that guaranteed backup program 129 can be integrated with the backup application on host 120 (e.g., through an API, RPCs or other programming mechanism) to allow the backup application on host 120 to notify guaranteed backup program 129 that all the commands for a particular backup operation have been issued (i.e., so that guaranteed backup program 129 knows to stop recording commands for a particular backup operation). According to another embodiment commands/executables can be added to the sequence of commands for the backup operation (e.g., through a batch file or other suitable mechanism) that cause the backup application to send notifications to the guaranteed backup application 129. The notifications can be communicated in various ways including Vendor Unique SCSI commands sent over the same SAN link or a custom protocol using TCP/IP connections or other mechanism.

Figure 3:
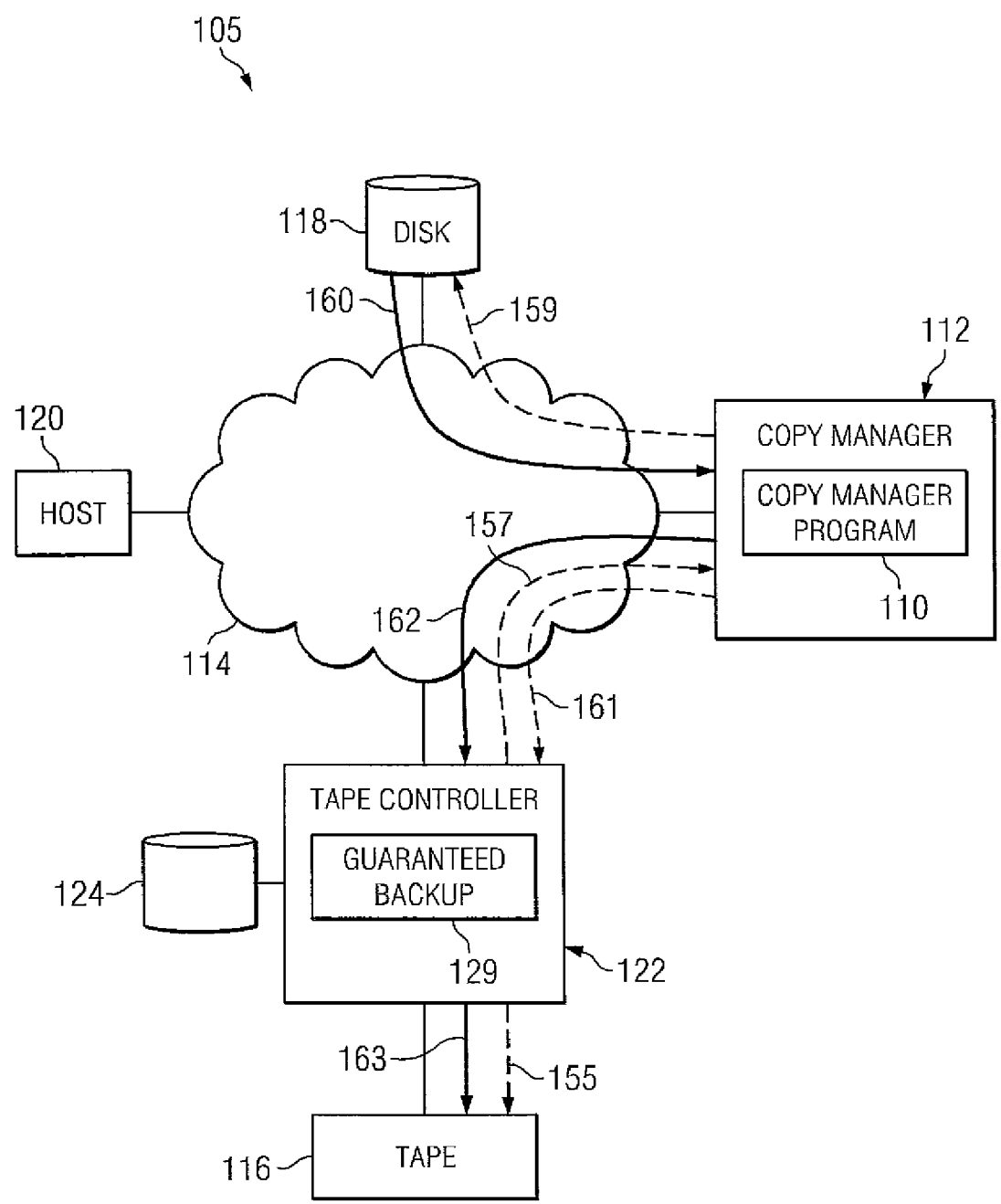
FIG. 3 is a diagrammatic representation of the flow of commands relating to a guaranteed backup controller retrieving recorded commands for execution according to one embodiment of the present invention.

FIG. 3 is a diagrammatic representation of the flow of commands for one embodiment of a guaranteed backup operation. Guaranteed backup program 129 can retrieve commands which had been previously recorded (e.g., extended copy commands, associated media commands, or other commands), send the media commands to the tape drive for execution (represented by flow 155) and forward the extended copy commands to data mover 112 for execution by copy manager program 110 (represented by flow 157).

Copy manager program 110 can execute the extended copy commands to generate corresponding read/write commands. As an example, a retrieved extended copy command may request backing up of data from hard disk drive 118 to tape drive 116. Copy manager program 110 can execute the extended copy command by sending a read command or commands to hard disk drive 118 (represented by flow 159). The snapshot mechanism can automatically translate the commands into commands referring to data stored in the snapshot. Copy manager program 110 can retrieve data from the snapshot (represented by flow 160) to retrieve data having a state corresponding to the time when the backup operation was originally initiated. Copy manager program 110 can further construct a write command or write commands and issue the write command or commands to tape controller 122 (represented by flow 161) to write data received from hard drive 118 to tape drive 116 (represented by flow 162 and 163).

The error handling of the embodiment of FIG. 3 can result in guaranteed backup of data from a storage device. When the data that is the subject of a failed backup operation is still available (e.g., in the snapshot), corrective measures can be taken and the backup operation retried. Upon receiving notice of the failure of a backup operation, guaranteed backup program 129 can retrieve the appropriate recorded commands relevant to the operation and send them to the copy manager 110 for execution on tape controller 122. The process of retrying the backup operation can be continued until it succeeds.

In the embodiment of FIGS. 2 and 3 the guaranteed backup program 129 is executed at tape controller 122. However, according to other embodiments of the present invention, data mover 112 can act as the guaranteed backup controller or a separate device can act as the guaranteed backup controller. In general, the device acting as the guaranteed backup controller is forwarded the extended copy command and media commands for an operation and records the extended copy command and media commands for the operation. When the guaranteed backup program 129 is notified of an error condition (e.g., from tape controller 122 or data mover 112) or otherwise notified of a condition that warrants issuing the recorded commands, guaranteed backup program 129 can reissue the extended copy command and media commands in the order they were originally issued by host 120.

Figure 4:
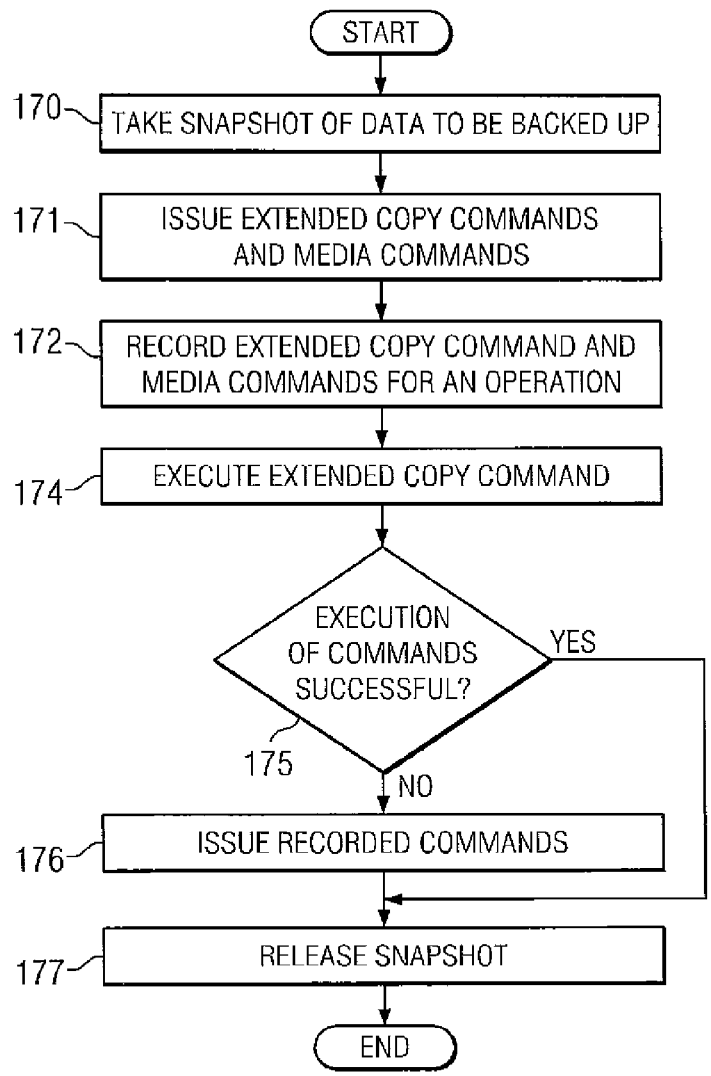
FIG. 4 is a flow chart illustrating the backup of data in a file system according to one embodiment of the present invention.

FIG. 4 is a flow chart illustrating the backup of data according to one embodiment of the present invention. The methodology of FIG. 4 can be implemented, for example, as a set or sets of computer executable instructions stored on a computer readable medium or mediums. At step 170, a snapshot can be taken to "freeze" the state of data for backup. The snapshot can be initiated by a host or other device. In other embodiments, a snapshot of the data is not taken and a backup operation can be processed on data that is not frozen.

At step 171, a host can issue commands for a backup operation including one or more extended copy commands and media commands. The extended copy command(s), for example, may call for the backup of data to a media library. The host can also issue media commands and send them to a destination storage device or media controller.

At step 172, the extended copy command(s) and media commands for a backup operation are recorded. The commands can be recorded so that they can be later reissued in the order in which they were initially issued. At step 174, the copy manager can attempt to execute the extended copy command(s) by issuing corresponding data movement commands (e.g., read/write commands) and the target drive can attempt to execute the media commands. The copy manager can attempt to read data from the data drives in which it is stored and write the data to the destination storage device. The destination storage device or storage controller can attempt to execute the media commands.

At step 175, the guaranteed backup controller can determine whether the execution of the backup operation was successful. The determination of success or failure of the backup can be based on the success or failure of the operations performed during the backup operation (i.e., the success or failure of the execution of the media commands and the extended copy commands). The guaranteed backup program is notified of any such errors (e.g., by extended copy program 110, media controller 122 or other mechanism). If commands initially issued by the host are executed (i.e., in the case in which execution of the command occurs in parallel with recording the commands), embodiments of the present invention can terminate processing the commands issued by the host when an error occurs, but continue recording the commands so that the commands can be later reissued by the guaranteed backup program. This allows a complete record of the commands for a backup operation to be recorded, even if initial execution of the commands fails. According to other embodiments, the commands are not executed when initially issued by the host, but rather are first recorded by the guaranteed backup program and then reissued. When the commands are reissued, they can be reissued in the same order, but optionally at a slower rate than issued by the host. This can allow errors to be detected earlier in the issuance in a series of commands.

At step 176, if the guaranteed backup controller determines that execution of the extended copy command(s) or associated media commands was unsuccessful, the guaranteed backup manager can issue the recorded commands. The data that was the subject of the extended copy command(s) may still be available in the snapshot, if a snapshot was taken. The copy manager may also make necessary modifications in the extended copy commands. It may, for example, change the identity of the destination tape cartridge when a defective cartridge has been replaced. As a result, the process of FIG. 4 can result in guaranteed backup using extended copy functionality. After completion of the backup operation, either when originally initiated or through the use of recorded extended copy and media commands, the snapshot can be released (step 177).

A failure of a backup operation can be remedied by taking corrective action and repeating the operation until successful. The process of FIG. 4 can be arbitrarily repeated as needed or desired.

The embodiment of FIG. 4 is for illustration and not limitation. Alternative embodiments can include the steps of FIG. 4 in a different order or can include different steps. For example, according to various embodiments, a snapshot is not taken. In other embodiments, for example, the commands can be recorded without an attempt at execution (a "virtual phase"). They can later be retrieved for execution (an "actual phase"). In a simple case, all of the commands relating to a backup operation can be stored before any are retrieved and executed; that is, the virtual phase completes before the actual phase begins. In a more complicated case, some of the commands from the virtual phase are still issuing as commands from the actual phase are being retrieved and executed.

While in the embodiment of FIG. 4, the guaranteed backup system records the extended copy command(s), according to another embodiment, the corresponding data movement commands can be recorded. In this embodiment, the copy manager can retrieve and reissue the recorded data movement commands rather than retrieving and executing the recorded extended copy command(s).

The guaranteed backup controller can be implemented at any point in the command path. The guaranteed backup program can reside on a device with a sufficient processor and memory and to store and execute the guaranteed backup program. The guaranteed backup program receives commands from the copy manager and tape controller for recordation. The commands can be received in-band or out-of-band with the transport medium over which the backup operation occurs. For example, the guaranteed backup program may receive copy commands from the copy manager via an Ethernet link, while backup of data occurs over a Fibre Channel SAN. The guaranteed backup program can record the received commands and later reissue the recorded commands. The guaranteed backup program can be implemented at the tape controller, copy manager or other device in communication with the tape controller and copy manager.

Figure 5:
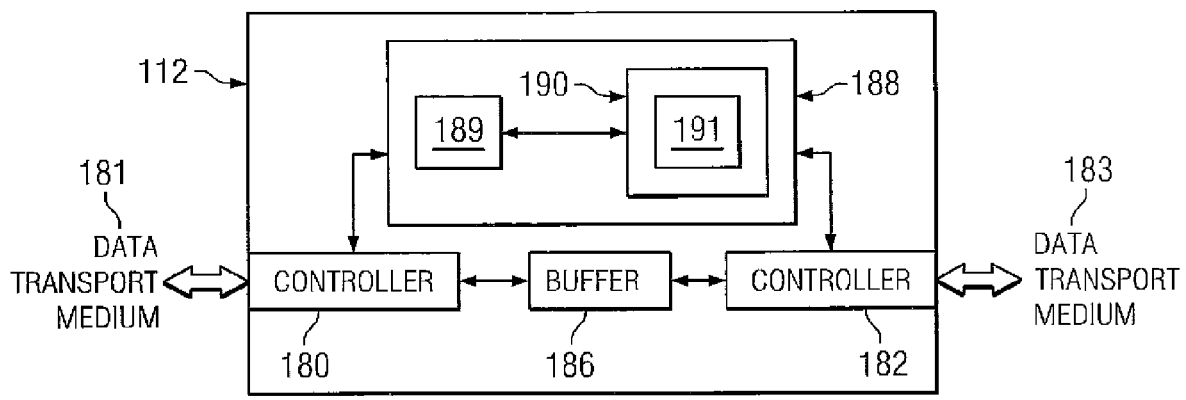
FIG. 5 is a diagrammatic representation of one embodiment of a routing device that can act as a copy manager device according to one embodiment of the present invention.

FIG. 5 is a diagrammatic representation of one embodiment of a data mover 112 in which extended copy commands can be processed according to embodiments of the present invention. According to one embodiment data mover 112 can be a routing device 112. Data mover 112 can comprise a first transport medium controller 180 that interfaces with a first transport medium 181 and a second transport medium controller 182 that interfaces with a second transport medium 183. In one embodiment of the present invention, the first and second transport medium 181 and 183 can be a Fibre Channel SAN; controller 180 and controller 182 can each be a Fibre Channel controller, such as a fibre channel controller based on the TACHYON family of fibre channel control chips. TACHYON fibre channel control chips are a product of Agilent Technologies, Inc. of Palo Alto, Calif. Various forms of the Tachyon fibre channel control chip can be used including, but not limited to, the TL or Tachlite (HPFC-5100), the XL2 (HPFC-5200x, where x is the Rev A, B, C, etc.), the DX2 (HPFC-5400x, where x is the Rev A, B, C, etc.), the DX4 (HPFC-5700x, where x is the Rev A, B, C, etc.).

Moreover, the transport media can operate according to other protocols. Additionally, the various transport media can carry commands according to a variety of command protocols including, but not limited to, SCSI-1, SCSI-2, SCSI-3, SPC-1 and SPC-2. In another embodiment, at least one of the transport mediums is a serial transport medium.

A set of buffers 186 provides memory work space and is connected to both controller 180 and to controller 182. Buffers 186 can queue data corresponding to extended copy commands. In an embodiment of the invention, the buffers 186 can also be used to store extended copy commands or the lower-level read/write commands which are issued in executing the original extended copy commands for later retrieval and execution. A processing unit 188 can be connected to controller 180, controller 182 and buffers 186. According to one embodiment of the present invention, processing unit 188 comprises one or more processors 189 for controlling operation of routing device 112, handling address mapping and security access and converting commands between protocols and a computer readable medium 190 accessible by the processor 189 storing a set of computer instructions 191 that are executable by the processor. Computer instructions 191 can include instructions to implement a copy manager program. Computer readable medium 190 may also provide space for recording media commands and extended copy commands or lower-level read/write commands. According to other embodiments of the present invention buffers 186 and/or computer readable medium 191 can be onboard processor 189.

In one implementation (not shown), the routing device 112 can be a rack mount or free standing device with an internal power supply. Routing device 112 can have a Fibre Channel and SCSI port, and a standard, detachable power cord can be used, the FC connector can be an optical Small Form Factor ("SFF") connector, and the SCSI connector can be a VHDCI type. Additional modular jacks can be provided for a serial port and an 802.3 10BaseT port, i.e. twisted pair Ethernet, for management access. The SCSI port of routing device 112 can support SCSI direct and sequential access target devices and can support SCSI initiators, as well. The Fibre Channel port can interface to SCSI-3 FCP enabled devices and initiators or other Fibre Channel devices.

To accomplish its functionality, one implementation of the routing device uses: a Fibre Channel interface based on the Agilent XL2 2 Gb/s Fibre Channel controller and an optical SFF transceiver; a PMCS RM7000A processor, incorporating independent data and program memory spaces, and associated logic required to implement a stand alone processing system; and a serial port for debug and system configuration. Further, this implementation includes a SCSI interface supporting Ultra-2 based on the SYMBIOS 53C8xx series SCSI controllers, and an operating system based upon the WIND RIVER SYSTEMS VXWORKS kernel. In addition, the routing device can include software as required to control functions of the various elements, convert commands and responses between command protocols and generate commands and provide appropriate translations between the FC and SCSI data transport protocols (and for other protocol if necessary for other embodiments).

It should be noted that the example of the routing device of FIG. 5 is provided by way of example. Embodiments of the present invention can be implemented in routing devices such as routers, bridges, hubs or other routing devices in the command path. Additionally, embodiments of the present invention can be implemented as hardware and/or software programming. Embodiments can be implemented as computer instructions stored on any computer readable medium known in the art (e.g., optical disk, magnetic disk, flash memory, RAM, ROM, EEPROM or other computer readable medium). In alternative embodiments of the invention, the storage of extended copy commands for later retrieval and execution can take place in a hard disk drive connected to the router or in storage connected to a guaranteed backup controller.

Although the present invention has been described in detail herein with reference to the illustrated embodiments, it should be understood that the description is by way of example only and is not to be construed in a limiting sense. For example, while host 120 and hard disk 118 are both shown as being connected to the same transport medium, hard disk 118 can be connected to another transport medium (e.g., hard disk 118 can be behind a router). Additionally, for example, an additional hard disk (or other storage media) can be used to store a snapshot. As yet another example, a separate device can perform recording and reissuing of the extended copy commands. It is to be further understood, therefore, that numerous changes in the details of the embodiment of this invention and additional embodiments of this invention will be apparent, and may be made by, persons of ordinary skill in the art having reference to this description. It is contemplated that all such changes and additional embodiments are within scope of the invention.

What is claimed is:

1. A method for backing up execution of extended copy commands and media commands, comprising:
   providing a system comprising:
      a first storage device;
      a media controller running a backup program stored thereon and coupled to a media device;
      a second storage device coupled to the media controller; and
      a data mover comprising a copy manager program for processing an extended copy command (ECC) connected to the first storage device and the media controller via a network;
   receiving from a host, by the copy manager program, one or more extended copy commands for a requested operation of the media device;
   receiving from the host, by the media controller, one or more media commands for the requested operation of the media device;
   forwarding from the host, by the copy manager program, the extended copy command to the media controller;
   recording the one or more media commands by the media controller in the second storage device;
   recording the one or more extended copy commands in the second storage device by the media controller; and
   retrieving, from the second storage device, and issuing, by the media controller, one or more of the recorded one or more extended copy commands to the copy manager program and the recorded one or more media commands to the media device to perform the requested operation if the requested operation previously failed.

2. The method of claim 1, further comprising, executing the recorded extended copy command to transfer data based on a snapshot of the data.

3. The method of claim 2, further comprising:
   receiving a message that execution of the extended copy command was successful; and
   indicating that the snapshot of the data can be unfrozen.

4. The method of claim 1, wherein recording the one or more extended copy commands further comprise recording the one or more extended copy commands in secure storage.

5. The method of claim 1, wherein the recorded one or more extended copy commands are executed if an attempt to execute the operation fails.

6. The method of claim 1, further comprising:
   receiving a message that execution of the operation was unsuccessful; and
   reissuing the recorded one or more extended copy commands.

7. The method of claim 1, wherein the recorded one or more extended copy commands and one or recorded media commands are reissued in an order corresponding to an initial order of the one or more extended copy commands and one or more media commands.

8. The method of claim 1, wherein the one or more media commands are one or more tape drive commands.

9. A system comprising:
   a first storage device;
   a media controller coupled to a media device;
   a second storage device coupled to the media controller; and
   a data mover configured to:
      receive from a host, one or more extended copy commands for a requested operation of the media device;
      forward the extended copy command to the media controller; wherein the media controller is configured to:
         receive one or more media commands for the operation;
         record the one or more media commands in the second storage device;
         record the one or more extended copy commands in the second storage device; and
         issue the recorded one or more extended copy commands and the recorded one or more media commands to perform the requested operation if the requested operation previously failed.

10. The system of claim 9, wherein recording the one or more extended copy commands further comprises recording the one or more extended copy commands in secure storage.

11. The system of claim 9, wherein the recorded one or more extended copy commands are executed if an attempt to execute the one or more extended copy commands fails.

12. The system of claim 9, wherein said set of computer instructions further comprise instructions executable to:

receive a message that execution of the operation was unsuccessful; and reissue the recorded one or more extended copy commands.

13. The system of claim 9, wherein the recorded one or more extended copy commands and one or more recorded media commands are issued in an order corresponding to an initial order of the one or more extended copy commands and one or more media commands.

14. The system of claim 9, wherein the one or more media commands are one or more tape drive commands.

15. A system for execution of extended copy commands, comprising:

a host operable to issue one or more extended copy commands to copy data from a first storage device to a second storage device and issue one or more media commands to a media controller;

a copy manager in communication with the host configured to execute the one or more extended copy commands, wherein the copy manager is further configured to perform the steps of:

receiving one or more extended copy commands for a requested operation of a media device;

forwarding the one or more extended copy commands to guaranteed backup controller; and a guaranteed backup controller in communication with the copy manager configured to:

record the one or more extended copy commands and the one or media commands in storage;

retrieve the recorded one or more extended copy commands and the recorded one or more media commands in storage;

issue the retrieved on or more media commands to the media device and the retrieved one or more extended copy commands to the copy manager over a network to perform the requested operation if the requested operation previously failed.

16. The system of claim 15, wherein the guaranteed backup controller is further configured to retrieve the one or more recorded extended copy commands from storage and issue the recorded one or more extended copy commands to the copy manager.

17. The system of claim 16, further comprising a media controller in communication with the host.

18. The system of claim 17, wherein the guaranteed backup controller is further configured to receive and record one or more media commands.

19. The system of claim 18, wherein the guaranteed backup controller is further configured to retrieve the recorded one or more media commands and issue the recorded one or media commands to the media controller.

20. The system of claim 19, wherein the media controller acts as the guaranteed backup controller.

21. The system of claim 15, wherein the copy manager executes the one or more recorded extended copy commands to backup the data using a snapshot of the data.

\* \* \* \* \*